May 26, 1970 E. W. PARKEN 3,514,770

RECIPROCATING MAGNETIC READ/WRITE HEAD

Filed Jan. 13, 1967 2 Sheets-Sheet 1

INVENTOR.

EDWARD W. PARKEN

BY E. Ronald Coffman

ATTORNEY.

May 26, 1970 E. W. PARKEN 3,514,770

RECIPROCATING MAGNETIC READ/WRITE HEAD

Filed Jan. 13, 1967 2 Sheets-Sheet 2

United States Patent Office 3,514,770 Patented May 26, 1970

3,514,770

RECIPROCATING MAGNETIC READ/WRITE HEAD

Edward W. Parken, Lexington, Ky., assignor to International Business Machines Corporation, Armonk, N.Y., a corporation of New York Filed Jan. 13, 1967, Ser. No. 609,234
Int. Cl. G11b *5/56, 5/58, 21/04*
U.S. Cl. 340—174.1 8 Claims

ABSTRACT OF THE DISCLOSURE

Random access of short records is accomplished through a read/write head having a pair of opposed magnetic transducers that are reciprocated past opposite magnetic surfaces of a thin, stiffly flexible record strip. Good contact between the transducers and the record surfaces is assured by construction of the transducer support which accommodates variously caused misalignments and non-linearities, and thereby permits high density recording. Shock of the transducers entering and leaving the record surface is minimized by adjacent apron strips aligned with the record.

SPECIFICATION OF INVENTION

Figure 1:
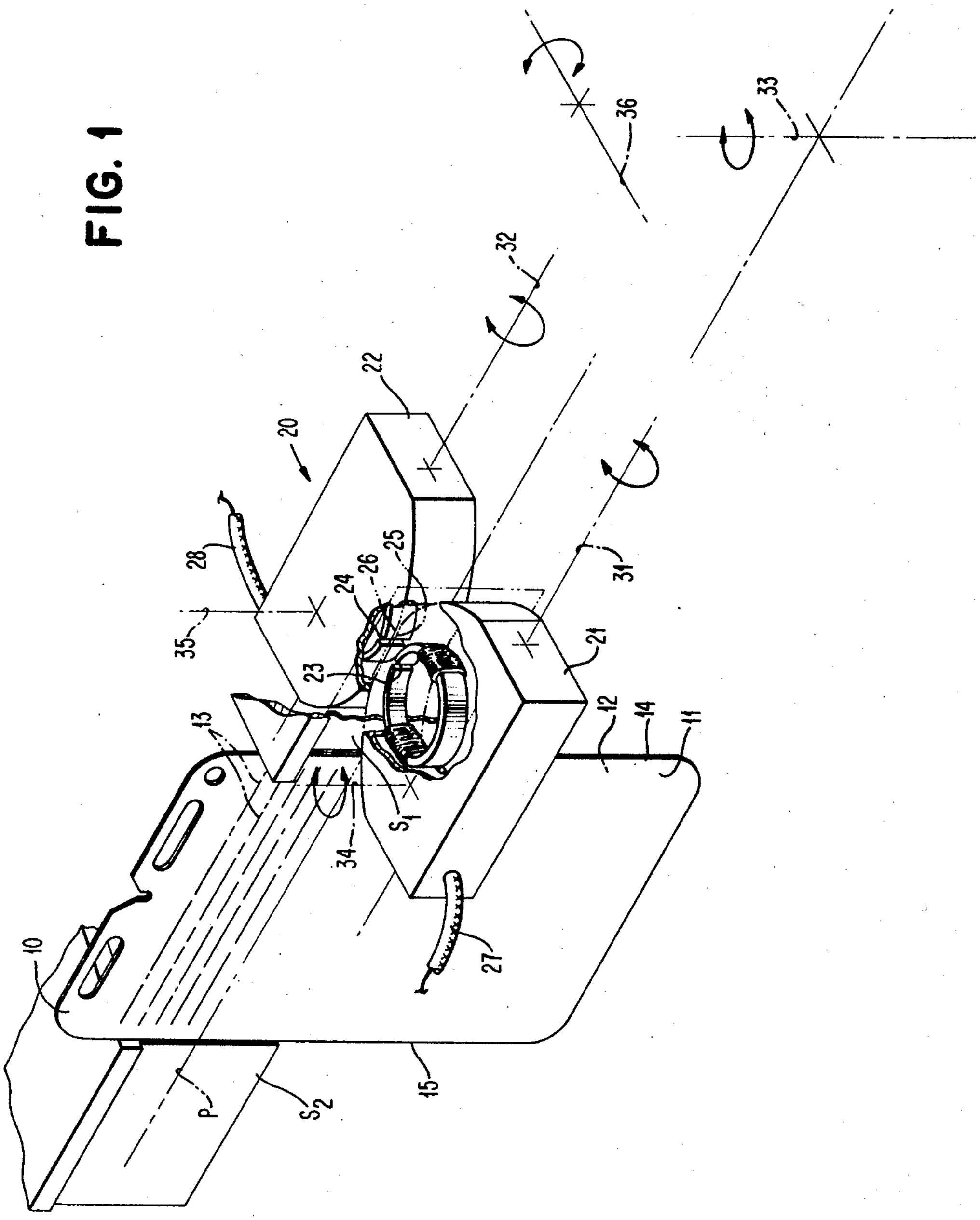

A random access file configuration is disclosed in U.S. patent application Ser. No. 609,233 filed Jan. 13, 1967, by J. W. Wood entitled, "Random Access Data File." That file employs magnetically recordable sheets or chips each containing a plurality of record tracks on its opposed surfaces. The tracks are selectively positionable in the path of a reciprocating magnetic read/write head for data entry into, and retrieval from the file. The present invention provides a read/write head mounting structure that permits convenient and effective adjustment of the heads relative to one another and to the path of reciprocation. The mounting structure also permits transducer movement during the operation to assure close, continuously conforming contact between the transducers and the thin record.

The reliability of magnetic reading and recording is an inverse function of bit density, a direct function of relative surface speed, and is related directly to the intimacy of contact that is maintained between the transducer and record surfaces. The first two variables are dictated by the performance specifications of the machine. For example, if a given amount of data is to be contained within a given length of record track and is to be read or written at a data rate compatible with an existing system, adequate reliability is obtained principally by assuring continuous transducer contact. Transducer contact tolerance gets particularly critical in an operator oriented environment, such as an accounting computer, where record size limits are small, data capacity is high and data rate is limited to that which also is efficient for receiving manual entry or causing output on typewriter-like printers. The transducer contact problem is aggravated by the use of moving transducers simultaneously traversing opposed sides of a thin record. As explained in aforesaid application Ser. No. 609,233, the accessing mechanism is preferably kept separate from the read/write mechanism to achieve a fast access time over a large capacity file while retaining an appropriately low data rate.

The useful length of a record track is limited to that portion which the transducer traverses at a substantially constant velocity and with adequately even contact pressure. It is accordingly desirable that the transducers be accelerated before contacting the record surface, and be decelerated after leaving it. In addition, it is desirable that the shock of the transducer entering and leaving the record be minimized to minimize contact pressure transients and transducer damage.

I have overcome these problems by pivotally supporting the opposed transducers for movement about axes that are substantially parallel to the path of reciprocation. This degree of freedom compensates for slight misalignment of the record relative to the plane of the transducer faces. I have found that this degree of freedom permits a significant increase in high data density reliability. Significant improvement over a rigid system is provided even where this degree of freedom is limited to an adjustment freedom rather than a floating freedom, as preferred. One of the transducers is also pivoted for movement toward and away from the path of reciprocation and is loaded by an adjustable spring against the other transducer to maintain a proper contact pressure.

The transducers are also mounted for pivotal adjustment (as opposed to pivotal freedom) about axes parallel to the transducer magnetic "gap" to permit mutual alignment of the "gaps" in the direction of the path and thereby assure continuous contact on both sides of the record. Adjustment of the transducers about the "gap" aligning axes is preferably achieved by an adjustment bolt and opposed bias spring that minimizes backlash. The "gaps" are further mutually aligned transversely to the path of reciprocation by pivotal adjustment of one transducer about an axis that is normal to the path. This adjustment is preferably achieved by an eccentric bushing.

I have provided a pair of flexible film apron strips positioned in alignment with and at opposite ends of the path of reciprocation to minimize the effects of the transducers entering and leaving the record. The apron strips are approximately the same thickness as the record. Accordingly, the transducers are not caused to bounce outwardly or inwardly as they traverse the record side edges. As mentioned above, the record length efficiency is thereby improved and transducer damage avoided.

A preferred embodiment of my invention has reliably functioned at a data rate of 31,250 bits per second on a record having a bit density of 800 bits per inch which provides a single track record of 800 data bits within the readable region of a chip that is 1.4 inches wide.

Figure 2:
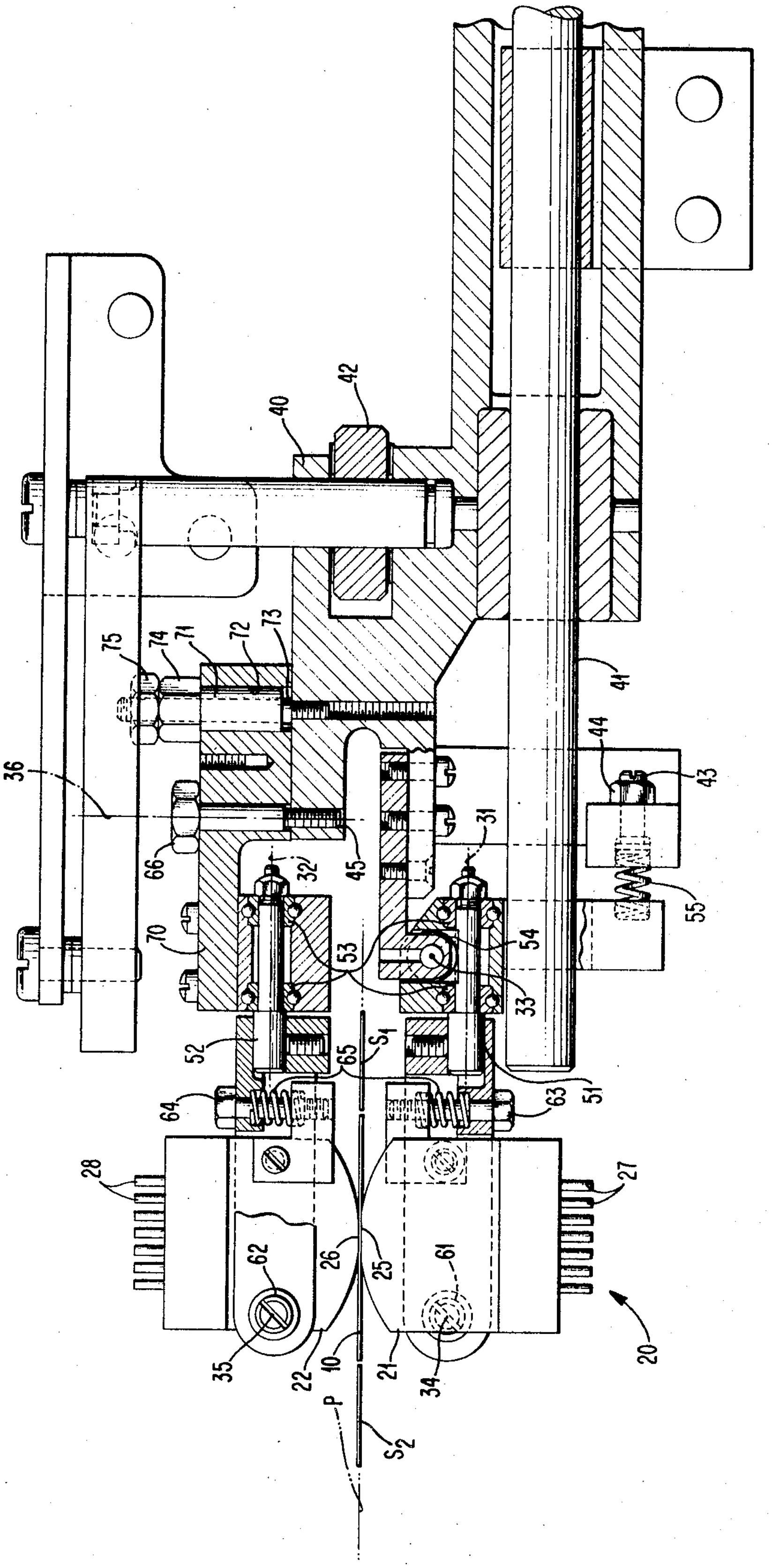

Further objects, features and advantages of my invention will be apparent to those skilled in the art from the following more specific description of the preferred embodiment of my invention wherein reference is made to the accompanying drawings, of which:

FIG. 1 is a perspective schematic view of a pair of magnetic transducers illustrating the concepts of this invention, and FIG. 2 is a top or plan view, partly in cross-section of a preferred embodiment of my invention employing those concepts illustrated in FIG. 1.

In FIG. 1 there is shown a stiffly flexible magnetic record sheet or chip 10 having a pair of opposed principal surfaces 11 and 12 that are coated with an appropriate magnetically recordable material as well known in the prior art. Each of the surfaces 11 and 12 provide a plurality of linear record tracks 13 which can be positioned selectively in line with the path P of a read/write head 20 which includes a pair of reciprocating electromagnetic record transducers 21 and 22. Mechanism for positioning the record track is described in the aforesaid copending U.S. patent application, Ser. No. 609,233. The transducers 21 and 22 have magnetic gaps 23 and 24 which lie in flat surface portions 25 and 26 of their respective transducers and on the path P thereof to permit communication between the record 10 and electrical output conduits 27 and 28. The transducers 21 and 22 normally rest on an apron strip $S_1$ of a stiffly flexible material that is aligned with the path P. Apron strip $S_1$ minimizes the abruptness of the chip side edge 14 to the transducers. Similarly, an apron strip $S_2$ is positioned adjacent record side edge 15 to receive the transducers at the extreme end of their stroke.

CONFORMING FREEDOM

Both transducers 21 and 22 are pivoted for free rotation about respective axes 31 and 32 which are parallel to the path P. This free rotation accommodates misalignment of the chip 10 relative to the plane of the transducer surface portions 25 and 26. It can be seen that rigidly held transducers would be caused to separate by a canted chip 10 and thereby the intimacy of transducer surface contact would be lost. Slight misalignment or canting of the chip 10 in my mechanism results only in slight rotation of the transducers 21 and 22 about their axes 31 and 32. Obviously, the degree of chip misalignment permissible is limited by the displacement that could cause complete transverse misalignment between the record track 13 and the transducer gaps 23 and 24.

If somewhat lower bit density is acceptable, adjustment freedom about axes 31 and 32 can be substituted for the preferred free rotation.

Contact pressure of the transducers 21 and 22 is maintained by spring biased pivotal freedom of transducer 21 about pivot axis 33 which is substantially normal to axes 31 and 32 and is oriented to permit movement of the transducer 21 toward and away from the path P. The transducer 22 thus performs as a back-up member for transducer 21.

ADJUSTMENTS

To permit adjustment of the mutual angular position of the flat surfaces 25 and 26 of the transducers 21 and 22, and alignment of the gaps 23 and 24, I have provided a freedom of movement about respective pivot axes 34 and 35 which are parallel with the gaps 23 and 24 and with the axis 33. This adjustment insures contact of both transducers with the respective surfaces 11 and 12 of the chip 10.

Slight misalignment of the transducers relative to the plane of the chip 10 will result in a non-intimate contact with the surface of the chip and thereby will reduce the ability of the system to record and read at high densities and low surface-to-surface speed.

For adjusting the magnetic gaps vertically in the plane of the chip for accurate alignment with each other, so that they traverse the same path, transducer 22 is made pivotal about an axis 36 which is normal to axis 33 and axes 31 and 32. It is necessary that the effective read/write path of both transducers is the same to insure accurate alignment with the tracks 13 on the chip 10. The adjustment axis 36 is displaced relatively far from the gap 24 to minimize arcuate effects of the motion and to thereby approximate direct vertical motion.

By providing the foregoing degrees of conforming and adjustment freedom, I have been able to maintain substantially continuous intimate contact between the transducers 21 and 22 and opposed surfaces 11 and 12 of the chip 10 while reliably performing as described above. A preferred embodiment of my invention showing the structural implementations of the concepts disclosed above, is shown in FIG. 2.

As shown in FIG. 2, the transducers 21 and 22 are mounted through various intervening parts to a reciprocable carriage or drive arm or mounting arm 40 that is slidably supported on a guide track or rod 41 which defines the rectilinear motion of the transducers along the path P. The carriage 40 is driven leftwardly through a roller 42 by mechanism shown in the aforesaid U.S. patent application Ser. No. 609,233.

The transducers 21 and 22 are shown at a point midway of their reciprocal movement where they are engaging the record 10. Apron strips $S_1$ and $S_2$ are shown in cross section.

Pivot axes 31 and 32 are defined by support structure interconnecting the transducers 21 and 22 with the carriage 40 and including a pair of pin shafts or support fingers 51 and 52. Suitable tolerance ball bearings 53 support the pin shafts 51 and 52 to permit the transducers 21 and 22 freedom to pivot as required to accommodate slight misalignment of the chip as explained above. The supporting structure including finger 51 is mounted on carriage 40 by a close tolerance ball bearing 54 that defines axis 33 which is perpendicular to the path in FIG. 2.

The contact pressure of the transducers 21 and 22 on the magnetic surfaces of the chip 10 is adjustably determined by a spring 55 carried by an adjustment stud 43 and locking nut 44.

The transducers 21 and 22 are connected to the supporting structure including their respective fingers 51 and 52 by close tolerance ball bearings 61 and 62 which respectively define the axes 34 and 35. Adjustment about these axes is accomplished through bolts 63 and 64 which are connected to the transducers at points offset from the pivot axes. The bolts 63 and 64 are each loaded against a relatively stiff individual spring 65 to permit backlash free bi-directional adjustment.

Adjustment axis 36 is provided in the supporting structure for transducer 22 by bushing bolt 66 that pivotally supports an arm 70 on the carriage 40 via threaded connection 45. An eccentric adjustment bushing 71 is carried by a bore 72 within the arm 70 and is supportedly attached to the carriage 40 by a screw mounting stud 73. The eccentric bushing 71 includes a bolt head 74 extending therefrom by which the eccentric can be rotated to pivot the arm 70 about axis 36. A locking nut 75, threadably attached to the stud 73, clamps the eccentric bushing 71 in any desired set position. The magnetic gap 24 (see FIG. 1) of transducer 22 thus can be adjusted vertically relative to the gap 23 of transducer 21 by turning the eccentric nut 74.

Spring 55 is the primary dynamic element in the system so far as stability of contact is concerned. Accordingly, its spring rate is selected to optimize the stability of the mechanism considering the inertial characteristic of the moving transducers 21 and 22 and their adjunct mechanism.

Those skilled in the art will appreciate that I have provided an easily adjusted, readily manufacturable, and structurally sound transducer support capable of eliminating magnetic read/write problems resulting from the use of a relatively loosely supported thin record that is scanned simultaneously upon opposed sides. While a specific embodiment of my invention has been shown herein for purposes of illustration, it will be understood that other structure can be employed to embody the concepts taught herein and the scope of my invention is to be limited only as defined in the appended claims.

I claim:

1. A magnetic read/write head for physically scanning the surface of a stiffly flexible magnetic record and including a backup member, an electro-magnetic record transducer, a mounting arm, support structure means interconnecting said transducer with said mounting arm for supporting said transducer adjacent to said backup member and in direct opposition therewith for physically contacting the surface of a magnetic record received between said backup member and said transducer, and means for relatively moving said mounting arm and said record along a path; wherein said support structure means comprises the improvement of:

bearing means constraining movement of said support structure means relative to the said mounting arm for pivotal movement about a first axis that is normal to said path to permit movement of said transducer toward and away from said path, resilient means urging said transducer about said first axis toward said backup member for contacting a magnetic record positioned therebetween, means defining second and third mutually perpendicular axes about which said transducer is permitted to move relative to said mounting arm, said second axis being substantially parallel to said path and said third axis being substantially parallel to said first axis, and adjustable securing means for restraining movement of said transducer against pivotal movement about said third axis.

2. A magnetic read/write head as defined in claim 1 for simultaneously physically scanning opposed surfaces of the magnetic record wherein said backup member is a further electro-magnetic record transducer, wherein the improvement further comprises:

a further support structure means interconnecting said further transducer with said arm, said further support structure means including means defining fourth and fifth mutually perpendicular axes about which said transducer is permitted to move relative to said arm, said fourth axis being substantially parallel to said path and said fifth axis being substantially parallel to, and aligned transversely with said third axis, and adjustable securing means for restraining movement of said further transducer against movement about said fifth axis.

3. A magnetic read/write head as defined in claim 2 comprising the further improvement of:

means adjustably pivotally mounting one of said support structure means for movement about a sixth axis that is substantially normal to both said first and second axes.

4. A magnetic read/write head as defined in claim 3 further comprising an adjustable eccentric for holding said one support structure means in various angular positions relative to said sixth axis.

5. In a system for storing and retrieving information carried on a record having opposed first and second magnetically recordable surfaces bounded by first and second side edges and including a pair of adjacent mutually opposed electro-magnetic record transducers supported to receive the respective surfaces of a record therebetween and means for reciprocating said pair of transducers along a path that intersects said side edges and traverses said surfaces; wherein the improvement comprises:

at least one apron strip positioned in substantial alignment with said path and closely adjacent to one of said record side edges whereby shock of said pair of transducers crossing said one side edge during said reciprocal movement is minimized.

6. A system as defined in claim 5 further comprising a second apron strip positioned in substantial alignment with said path and closely adjacent to the other of said record side edges.

7. A system as defined in claim 5 wherein said transducer reciprocating means includes a reciprocable drive arm, and means supporting said transducers on said arm for movement along said path, said supporting means comprising the improvement of:

a first support finger pivotally carried by said arm for supporting one of said pair of transducers for limited movement about a first axis that is substantially parallel to said path, means additionally mounting said first finger for resiliently-opposed pivotal movement about a second axis that is substantially normal to said first axis to permit movement of said one transducer toward and away from said path, means adjustably pivotally connecting said one transducer to said first finger for movement relative thereto about a third axis that is substantially parallel to said second axis, a second support finger pivotally carried by said arm for supporting the other of said pair of transducers for limited movement about a fourth axis that is substantially parallel to said path, and means pivotally connecting said other transducer to said second finger for movement relative thereto about a fifth axis that is substantially parallel to and aligned transversely with, said third axis.

8. A system as defined in claim 7 comprising the further improvement of:

means adjustably pivotally mounting one of said fingers for movement about a sixth axis that is substantially normal to both said first and second axes.

References Cited

UNITED STATES PATENTS

| | | | |
|---|---|---|---|
| 3,081,381 | 3/1963 | Merry | 179—100.2 |
| 3,193,810 | 7/1965 | Sampson | 179—100.2 |
| 3,227,457 | 1/1966 | Tada | 179—100.2 |

FOREIGN PATENTS

| | | |
|---|---|---|
| 922,889 | 4/1963 | Great Britain. |

BERNARD KONICK, Primary Examiner

W. F. WHITE, Assistant Examiner

U.S. Cl. X.R.

179—100.2; 235—61.11; 346—74